(12) United States Patent
Fontdecaba Buj

(10) Patent No.: US 6,942,230 B1
(45) Date of Patent: Sep. 13, 2005

(54) ANTI-ROLLING AND ANTI-PITCHING SYSTEM FOR A MOTOR VEHICLE, AND DEVICE FOR MAKING THE SAME

(76) Inventor: Josep Fontdecaba Buj, Av. València 6-8, 08750-Molins de Rei (Barcelona) (ES) 08750

( * ) Notice: Subject to any disclaimer, the term of this patent is extended or adjusted under 35 U.S.C. 154(b) by 0 days.

(21) Appl. No.: 10/031,872

(22) PCT Filed: Jul. 27, 2000

(86) PCT No.: PCT/ES00/00277

§ 371 (c)(1),
(2), (4) Date: Jan. 24, 2002

(87) PCT Pub. No.: WO01/08910

PCT Pub. Date: Feb. 8, 2001

(30) Foreign Application Priority Data

Jul. 30, 1999 (ES) .................................... 9901725

(51) Int. Cl.[7] .......................... B60G 21/04; B60G 21/06
(52) U.S. Cl. ...................... 280/124.104; 280/124.106; 280/124.107; 280/124.158
(58) Field of Search .................. 280/124.104, 124.106, 280/124.158, 124.159, 5.505, 5.507, 124.107, 280/124.166

(56) References Cited

U.S. PATENT DOCUMENTS

| 2,184,202 A | * | 12/1939 | Tschanz | ............... 280/124.104 |
| 2,941,815 A | * | 6/1960 | Muller | ................ 280/124.107 |
| 3,147,990 A | * | 9/1964 | Wettstein | ..................... 280/104 |
| 5,447,332 A | * | 9/1995 | Heyring | ............... 280/124.104 |
| 5,486,018 A | * | 1/1996 | Sakai | ..................... 280/124.16 |
| 6,024,366 A | * | 2/2000 | Masamura | ........... 280/124.162 |
| 6,267,387 B1 | * | 7/2001 | Weiss | ................. 280/124.106 |
| 6,270,098 B1 | * | 8/2001 | Heyring et al. | ....... 280/124.104 |
| 6,499,754 B1 | * | 12/2002 | Heyring et al. | ....... 280/124.107 |

FOREIGN PATENT DOCUMENTS

| DE | 2810629 A | * | 9/1979 | .......... B60G 17/00 |
| WO | WO 9523076 A1 | * | 8/1995 | .......... B60G 21/067 |

* cited by examiner

*Primary Examiner*—Peter C. English
(74) *Attorney, Agent, or Firm*—Sughrue Mion, PLLC

(57) ABSTRACT

An antiroll and anti-pitch device for a vehicle having four wheels provided in a two-by-two arrangement, including a central resilient element, two central actuating elements, four wheel actuating elements, and four wheel transforming elements. Each of the wheel actuating elements is associated with one of the four wheels and capable of providing a transmitting force caused by a vertical force to which the associated wheel is subjected. The central resilient element is capable of opposing a force provided by a first of the central actuating element and a force provided by a second of the central actuating elements.

14 Claims, 10 Drawing Sheets

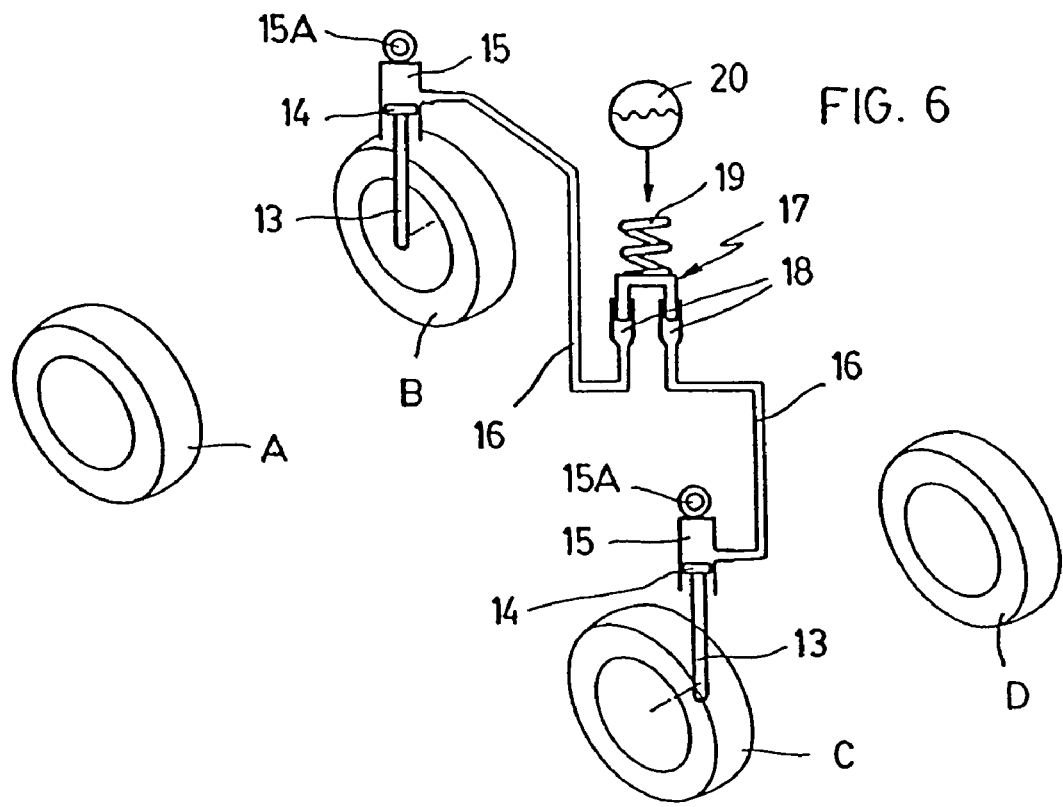
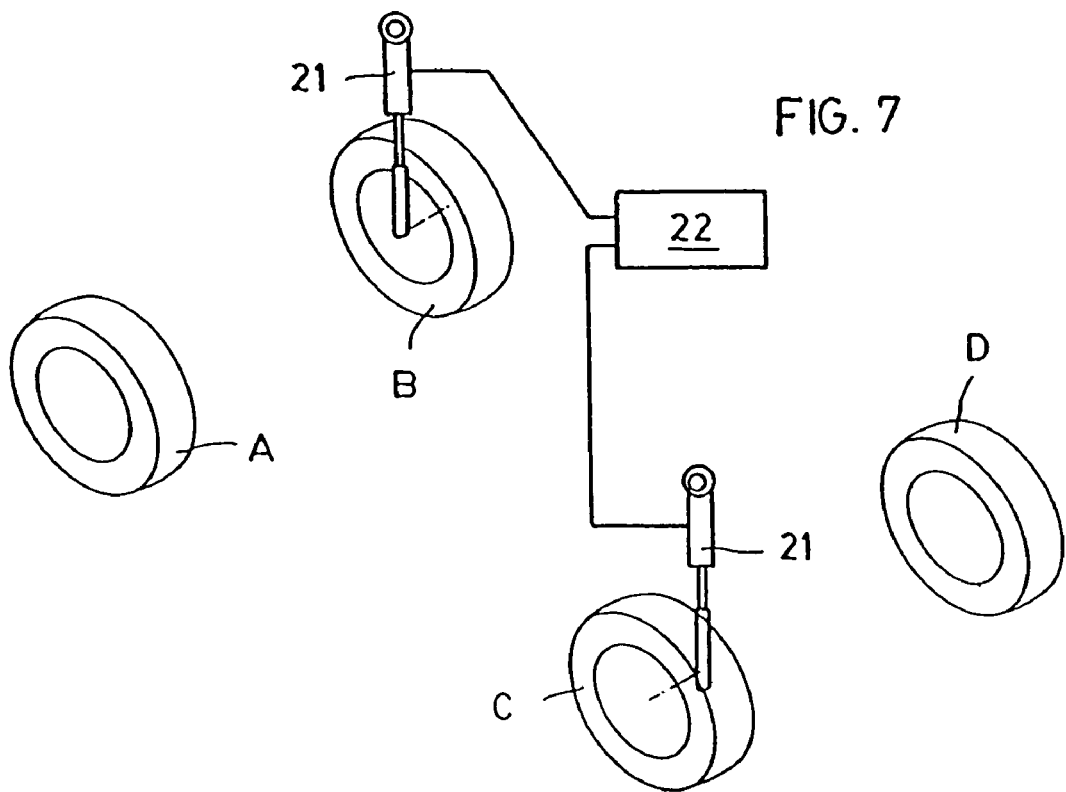

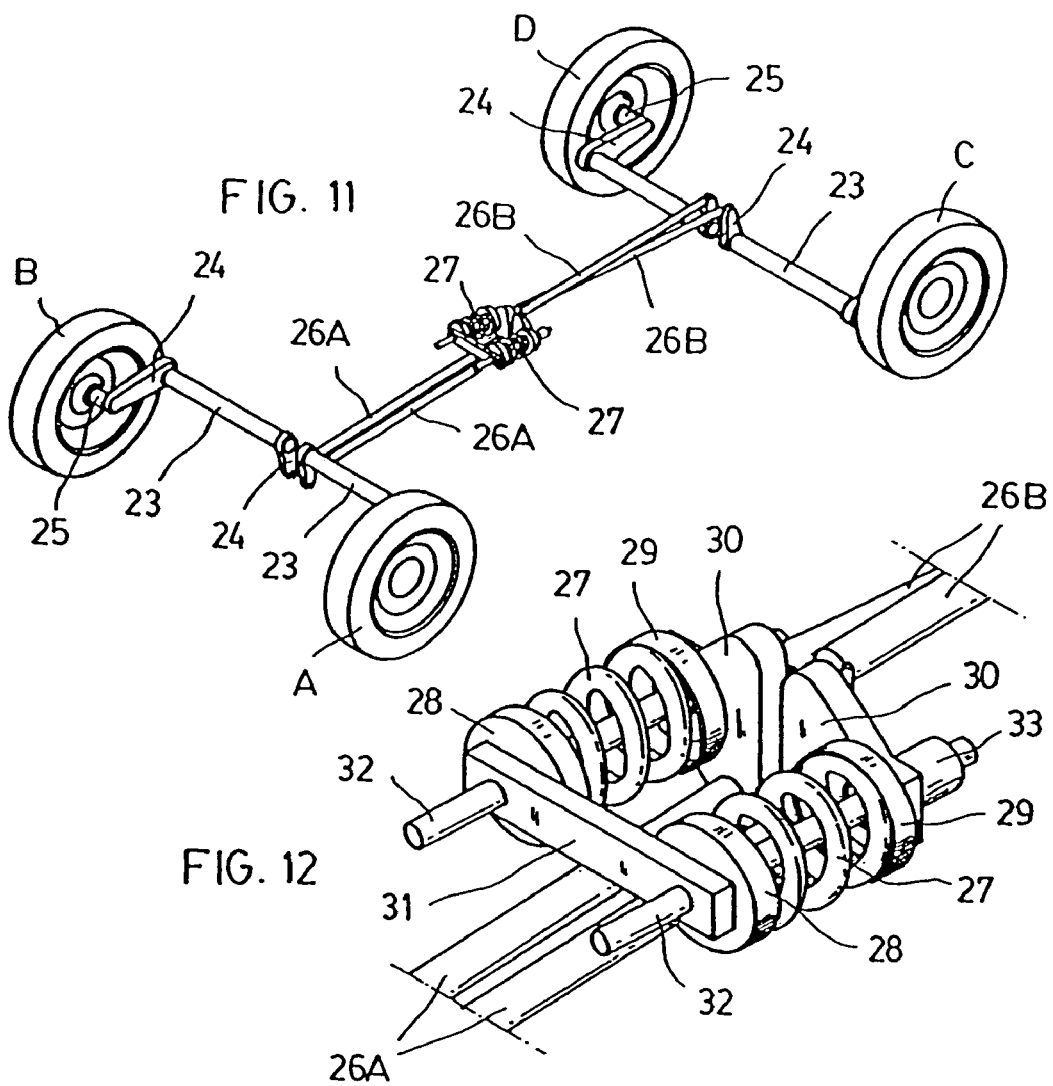
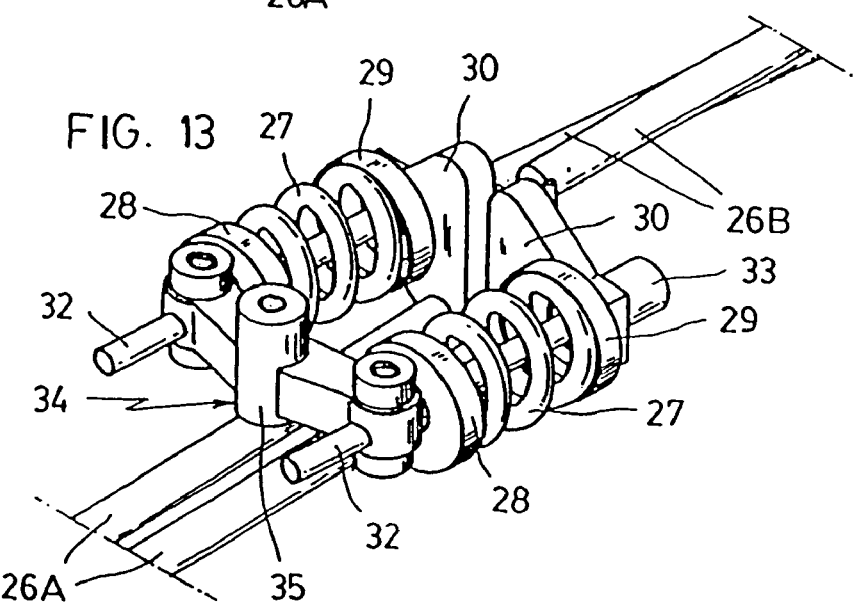

ANTI-ROLLING AND ANTI-PITCHING SYSTEM FOR A MOTOR VEHICLE, AND DEVICE FOR MAKING THE SAME

FIELD OF THE INVENTION

This invention relates to an anti-roll and anti-pitch system for a vehicle, and to the devices for its implementation, specifically a system to be applied to vehicles provided with four wheels. The system either cooperates with the vehicle's suspension system or substitutes for the vehicle's suspension system in order to allow the four wheels to keep contact with the ground and to keep an even distribution of load even if the vehicle is subject to uneven terrain. Where the wheels are provided in a two-by-two manner, the wheels that diagonally oppose each other are related in such a way that the loads created by the vertical movements of one of the wheels is transmitted to the opposite wheel in order to transmit such a force that creates a similar movement in the vertical direction of the opposite wheel. The system cooperates with the suspension of the vehicle, or is substituted for the suspension of the vehicle in order to allow all of the vehicle's wheels to keep contact with the ground even if the terrain is irregular and prevents unwanted effects that are caused by the uneven terrain.

A vehicle suspension is built mainly with coil springs and resilient elements that bear the vehicle body and transmit its weight and the inertial forces to the wheels. This provides a means to absorb the vibrations caused by the travel of the vehicle over the road irregularities. Such springs and elastic elements are accompanied with shock absorbers in order to minimize the sprung movements and to avoid prolonged oscillations.

In addition to absorbing vibrations or shocks from the road surface, a vehicle suspension must provide a safe ride, keeping an optimal position in the straight trajectory, and vehicle safety during cornering.

Vehicle stability is strongly related with the oscillations of the vehicle body along its course when the vehicle experiences heading, pitch, and roll movements in addition to rebounds. Such oscillations have to be absorbed to increase the stability and comfort of vehicle ride.

STATE OF THE ART

Stabilizing bars are well-known means used to control the roll naturally generated when the vehicle is in operation.

A conventional anti-roll system uses a stabilizing bar that has a small resilient component to provide adequate comfort during the ride. This system, however, cannot accomplish its purpose satisfactorily when the vehicle turns, due to the centrifugal force generated when cornering.

On the contrary, if the anti-roll bar is very stiff, it will interfere with the suspension system and will impair the comfort of the vehicle ride.

In U.S. Pat. No. 2,840,387, the forces created in a vehicle wheel as it turns are transmitted by two tie-rods to the diagonally opposed wheel, which reproduces the force in the same direction. In U.S. Pat. No. 3,147,990, the wheels on one side of the vehicle are connected to each other and also to those on the other on the other side by means of torque arms. In U.S. Pat. No. 3,992,026, right and left torsion bars generally extend in the longitudinal direction and interconnect the right and left sides of a front anti-roll bar with right and left rear suspension arms, respectively. In U.S. Pat. No. 5,505,479, two front suspension lower arms are aligned transversally between opposite front and rear wheels, and connected by a resilient element located longitudinally, for the purpose of transforming the vertical movements of the wheels into a rotary motion as seen from the front of the vehicle. U.S. Pat. No. 5,882,017, a perpendicular connecting rod is coupled to the vehicle and a pair of articulating elements link such connecting rod to the front wheels, including a pair of travel limits selectively actuated that communicate with the central part of such connecting rod.

In ES 2110 509, the forces created in one wheel are transmitted hydraulically to the diagonally opposed wheel, using double-effect hydraulic cylinders. In WO 95/23076, similar to the above, the forces created in one wheel are transmitted to the diagonally opposed wheel by means of double-effect cylinders and, in one case, the single-effect cylinders connect the wheels on one side to each other and to a central device. In FR 1.535.641. U.S. Pat. No. 3,752,497 and U.S. Pat. No. 5,447,332, double acting hydraulic rams are used on each wheel provided two-by-two. The last two patents having a central device that relates the four wheels and includes a double or triple hydraulic cylinder where some linked pistons move in the same direction.

SUMMARY OF THE INVENTION

All known anti-roll systems interfere to some extent with the existing suspension system, as they have to show a critical resiliency to suit stability and adaptability to uneven terrains.

Therefore, it is desired to have an anti-roll system, and also an anti-pitch system that would not interfere in geometric terms with the existing suspension system, and that can cooperate with the suspension system or substitute for the suspension system, being able to show an arbitrary rigidity without compromising the vehicle stability.

With such premises, an anti-roll and anti-heading system for a vehicle has been developed that, along with its implementation devices, provides the object of present invention. In this system the wheels are related through interaction means that receive the effect from one or more wheels before transmitting the effect to the other wheels in order to maintain a uniform load distribution of the weight and reduce the vehicle heading and rolling.

The invention assumes that the forces created by the vertical movements from one wheel is transmitted to the diagonally opposite wheel either through mechanical means able to resiliently resist forces of traction, compression, torsion and flexion, through hydraulic means, through pneumatic means or through electrical or electronic means used to command servo actuators on each wheel. These means can be provided either separately or any combination.

According to the above-mentioned possibilities of implementing the system, the invention includes several cases of proper devices to implement the current system.

As in this invention, an anti-roll and anti-pitch device for a vehicle comprises a receiving element connected with a first wheel of the vehicle, which transmits the wheel vertical movements to a direct transforming element that converts the vertical movements into horizontal movements. An inverse transforming element converts these horizontal movements into vertical movements that are transmitted to a second wheel diagonally opposed to the first wheel, causing a vertical movement analogous to the movement of the first wheel.

In all these cases, the direct transforming element is related with the inverse transforming element by means of a transmission element that can be mechanical, hydraulic, pneumatic or electric.

One characteristic of this invention is the case where receiving and actuating elements are made of a rod connected on one end to one wheel through a universal joint, while the other end is articulated to a direct transforming element in the receiving end case, and to an inverse transforming element in the case of an actuating element. In this case, the direct transforming element is a first kind angled connecting rod, and the inverse transforming element is a second or third kind angled connecting rod, which pivot points are supported by the vehicle body through bearings.

According to this invention, the transmission means between pairs of direct and inverse transforming elements are made up by a rigid bar, connected at its ends with each transforming element. It has been anticipated too that the transmission means can be made of two flexible stays, in which case the two transforming elements are made of three arms connecting rods shaped as "T", with the pivot point near the intersection, the stays connected to the two ends of the shorter arms, and the third arm of both transforming elements working in the vertical direction.

It is also a characteristic of this invention that the resilient elements connected to the transmission elements are connected to the vehicle body through an articulated balance beam, in such a way that the its ends are connected to the resilient elements and the center is joined to the vehicle body.

Another characteristic of this invention is that the receiving and actuating elements can be the rods of pistons of single effect hydraulic rams, which are in turn the direct and inverse transforming elements, related through hydraulic conduits.

In one case, the hydraulic circuit is constituted by the two single effect hydraulic cylinders, which are the direct, and inverse transforming elements, and a hydraulic conduit that includes an inserted actuating device to keep the pressure in the circuit.

It is also a characteristic of this invention that when each receiving and actuating device is made up of single effect rams, the direct and inverse transforming elements are organized through interaction means made up of a central device built as a hydraulic ram containing two opposed concentric pistons with same areas each, and a spring or pressurized fluid acting in between of them, having each cylinder end a coaxial cylindrical compartment in correspondence with the active sections of such pistons, having each compartment a connection with the respective receiving or actuating element.

There is another preferred implementation where the interaction means that are related with each pair of wheels is built as a central hydraulic device made of three concentric coupled cylinders, closed at the ends of the set, where the central cylinder is of a larger diameter, and the two cylinders at its sides are both of equal diameter, having inside the cylinders two double-pistons, with no external rod, and one larger piston found inside the central cylinder, and a smaller piston in one of the smaller cylinders, in such a way as to determine five cavities: one central cavity, and two pairs of cavities at each side of the device separated by the smaller diameter pistons, being the double cavities at each end of the device connected respectively to the hydraulic conduits corresponding to hydraulic single effect rams at each diagonally opposed wheeling set, while the central cavity is connected to an actuating device built with resilient means and/or a fluid susceptible of being connected to an expansion chamber that opposes to the two double pistons getting closer to each other.

Another characteristic of the invention is that the central device central cylinder has an area approximately double to the areas of each side cylinder.

It is evident that with the appropriate modifications, such hydraulic elements can be adapted to become of pneumatic type.

The invention anticipates that the resilient means in the central cavity are actually provided by two elastic elements, each actuating independently on each of the larger pistons that close such central cavity, so the central hydraulic device is divided in two halves related through an additional conduit provided of flow regulation means.

Each double piston in the central hydraulic device can be built from two or more conventional pistons, linked with each other although actuating each one on independent hydraulic single effect rams, in such a way that the two or more new cavities of the new cylinders come to substitute the two pairs of cavities formerly separated by each piston of smaller diameter following the diagonal scheme, and linking the two groups of pistons through a resilient element acting as the former central cavity.

The invention contemplates the following facts:
a) Hydraulic fluid regulation or damping devices are inserted in the hydraulic conduits from the central device to each hydraulic ram linked to the wheels, or in between the cylinders associated to conjugated wheels.
b) The central cavity, the two pairs of side cavities, the conduits that connect these with the hydraulic rams at each wheel, or the hydraulic cylinders can be connected to one or more expansion pneumatic chambers through electro valves.
c) The four conduits that connect the double side cavities from the central hydraulic device to each hydraulic ram at the wheels is susceptible of being communicated through devices that allow a limited volume flow depending on the pressure differential between the conduits, being these devices preferably applied between conduits to wheels at the same side of the vehicle.

It is also possible to provide the means of introducing pressurized hydraulic or gaseous fluid in the central cavity, or drain it, with the purpose of varying the average distance between the wheels and the vehicle body. For this purpose it can also be used a mechanical device to provide a thrust between the two larger diameter pistons found in the central cavity of the central hydraulic device.

BRIEF DESCRIPTION OF THE DRAWINGS

FIG. 6 is a diagrammatic representation of the device that relates two diagonally opposed wheels through single effect hydraulic rams.

FIG. 7 is a diagrammatic representation of the device that relates two diagonally opposed wheels through servo actuators and an electrical/electronic circuit.

FIG. 11 is a diagrammatic representation of a configuration similar to FIG. 9 where the independent resilient elements are placed at a mid point of the transmission bars.

FIG. 12 is a diagrammatic zoomed perspective representation of the configuration of FIG. 11.

FIG. 13 is a diagrammatic representation of a detail like FIG. 12 where the two resilient elements are not independent and are related through a balance beam.

DETAILED DESCRIPTION

Figure 1:
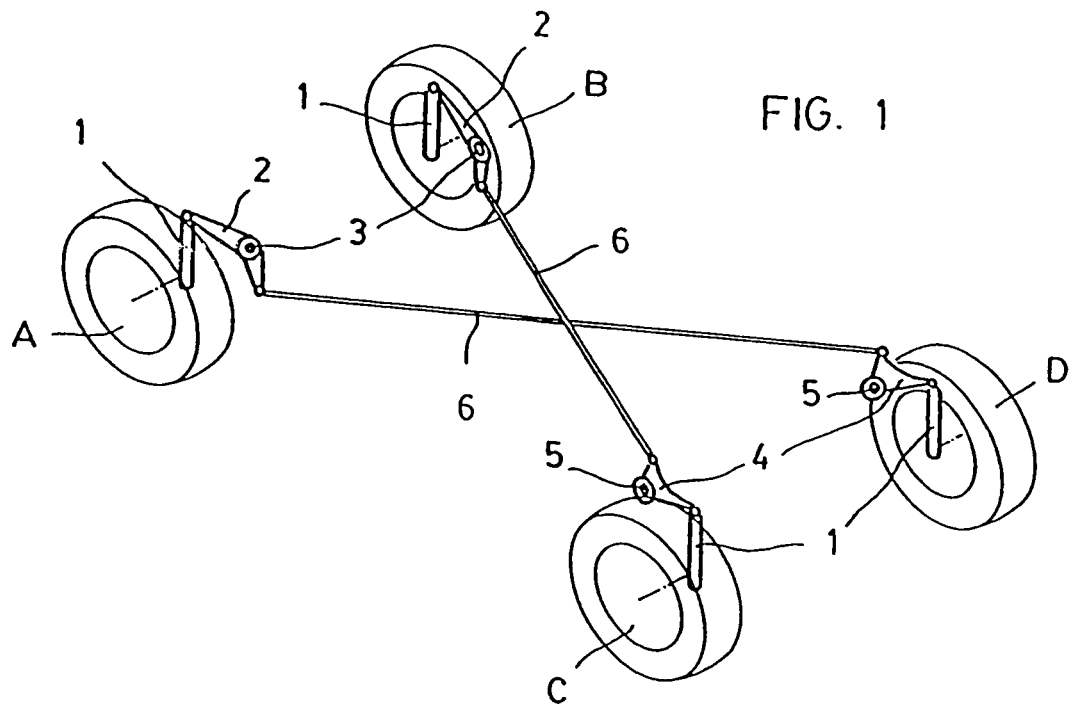
FIG. 1 is a diagrammatic representation of the anti-roll and anti-pitch suspension system for a vehicle.

The proposed anti-roll and anti-pitch suspension system relates, as represented in FIG. 1, the pairs of diagonally opposed vehicle wheels, in such a way that the forces created by the vertical movements of one of them are transmitted to the conjugated wheel in order to communicate a force that determines analogous movements in the same vertical direction.

FIG. 1 shows the front-left wheel A, front-right wheel B, rear-left wheel C and rear-right wheel D. The proposed system relates wheels A with D, and wheels B with C.

The axis of each wheel A, B, C and D is linked with a rigid element 1, which in turn is connected on wheels A and B to first kind connecting rods pivoting on 3, and on the other wheels to second or third connecting rod 4 pivoting on 5, being each connecting rod 2 related with connecting rod 4 diagonally opposite through a transmission element 6.

Figure 2:
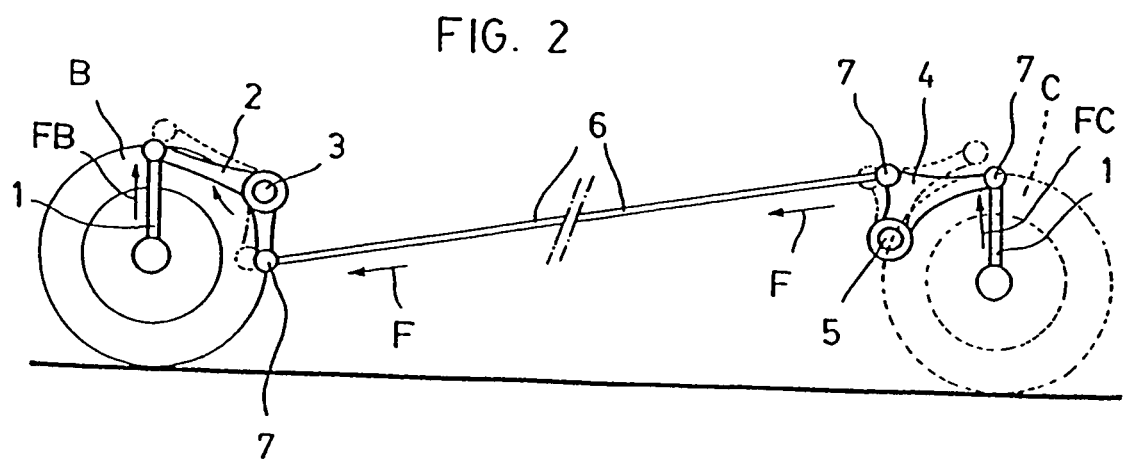
FIG. 2 is a diagrammatic representation of the device that relates two diagonally opposed wheels through a single push-pull strut.

FIG. 2 shows how a vertical force FB created by the terrain irregularities on the element 1 of wheel B is transformed through the corresponding connecting rod 2 into a non vertical force F that goes to the corresponding connecting rod 4 and gets transformed into a vertical force FC analogous to FB in direction and intensity.

The transmission of forces determined by the vertical movements in any of the two wheels of a diagonally opposed set is carried through mechanical means able to resiliently resist traction, compression, torsion and flexion forces, hydraulic and/or pneumatic means, and electric and/or electronic means that actuate through actuators on each wheel.

In general, this system can be implemented through a device as described below following again FIG. 2.

The device has a rigid element 1 that related with a first vehicle wheel B transmits its vertical movements FB to a direct transforming element such as connecting rod 2 that transforms them into horizontal or non-vertical movements, which in turn are transmitted through the elements 6 into an inverse transforming element such as connecting rod 4 that transforms these horizontal movements into vertical movements of the rigid actuating element 1 of a diagonally opposite second wheel C, subject then to a vertical movement analogous to the first wheel.

We have named receiving element or actuating element to the same rigid element 1, using the first meaning when this is the element that receives the terrain irregularity, and the second meaning when it actually transmits the movement to the wheel, so on both wheels receiving and actuating elements are the same. Analogously we can apply the same convention to the inverse and direct transforming elements.

In one of the implementations of this device, the rigid elements 1 acting as receiving or actuating element, are made up by an articulated connecting rod, linked through a joint 7 to one wheel at one end, and throng a second joint 7 to a direct transforming element in the other end, being this transforming element made of a first kind angled connecting rod 2 when the rigid element 1 works as a receiver, and an inverse transforming element made of a second or third kind angled connecting rod 4 when the rigid element 1 works as an actuator.

Figure 3:
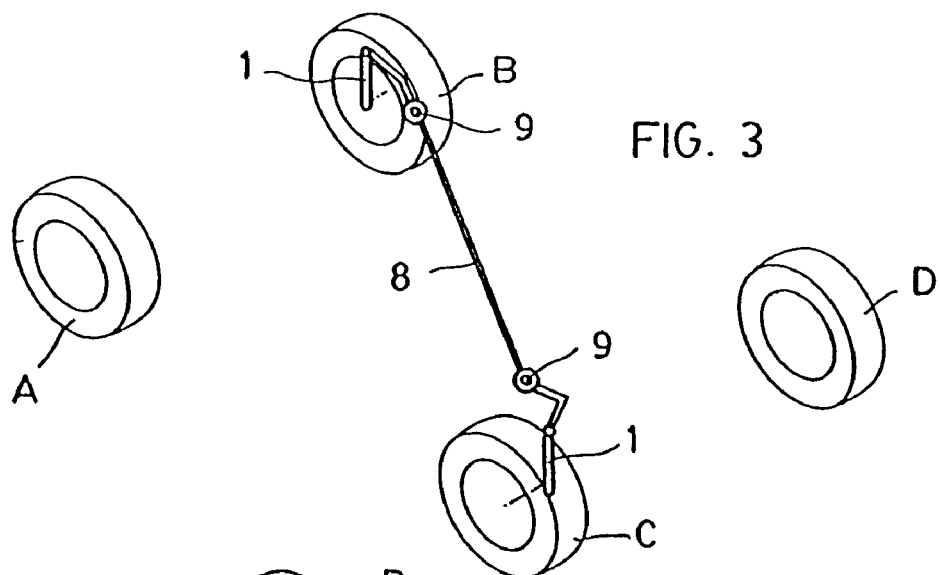
FIG. 3 is a diagrammatic representation of the device that relates two diagonally opposed wheels through a single torsion bar.
Figure 4:
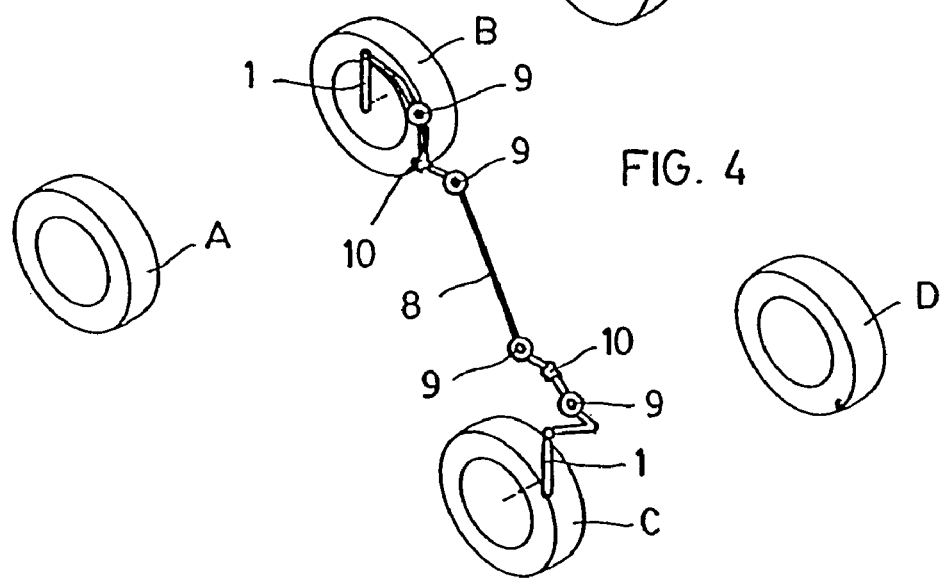
FIG. 4 is a diagrammatic representation of the device that relates two diagonally opposed wheels through an articulated torsion bar.
Figure 5:
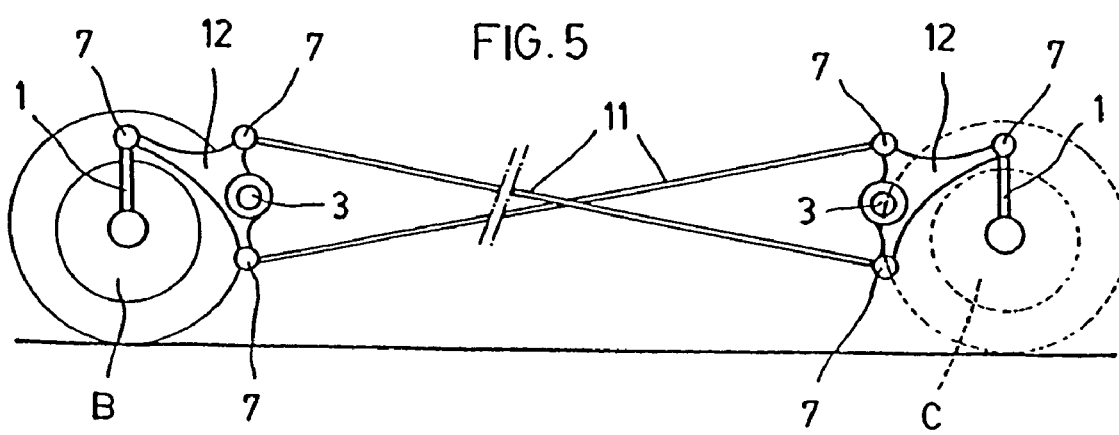
FIG. 5 is a diagrammatic representation of the device that relates two diagonally opposed wheels through a pair of pull-only flexible stays.

The transmission means 6 are made up by: a rigid bar linked at each end to the transforming elements 2 an 4 as seen in FIGS. 1 and 2; a one-piece torsion bar 8 linked to the vehicle body at point 9 such as in FIG. 3; by a torsion bar articulated through universal joints 10 as in FIG. 4; and by two flexible pull-rods 11 as in FIG. 5, where the two transforming elements are made of "T" shaped connecting rods 12 of three arms pivoting on 3 near the intersection, being the ends of the aligned arms connected to through joints 7 the ends of the crossing pull-rods 11, in such a way that the third arm actuates along the same vertical direction at each rigid element 1 working as receiving or actuating elements.

Another implementation of the invented device, as seen in FIG. 6, the rigid elements are the rods 13 connected to the pistons 14 of single effect hydraulic rams 15 mounted through a joint 15A to the vehicle body, being such pistons the direct and inverse transforming elements as shown in FIG. 6, where the hydraulic rams 15 are related through conduits 16 that have an actuating device 17 that using hydraulic rams 18, elastic elements 19 and/or pneumatic means 20 keep the pressure in the circuit.

FIG. 7 represents the case where each wheel has a conjugated pair of a servo actuator 21 related to a control unit 22.

Figure 8:
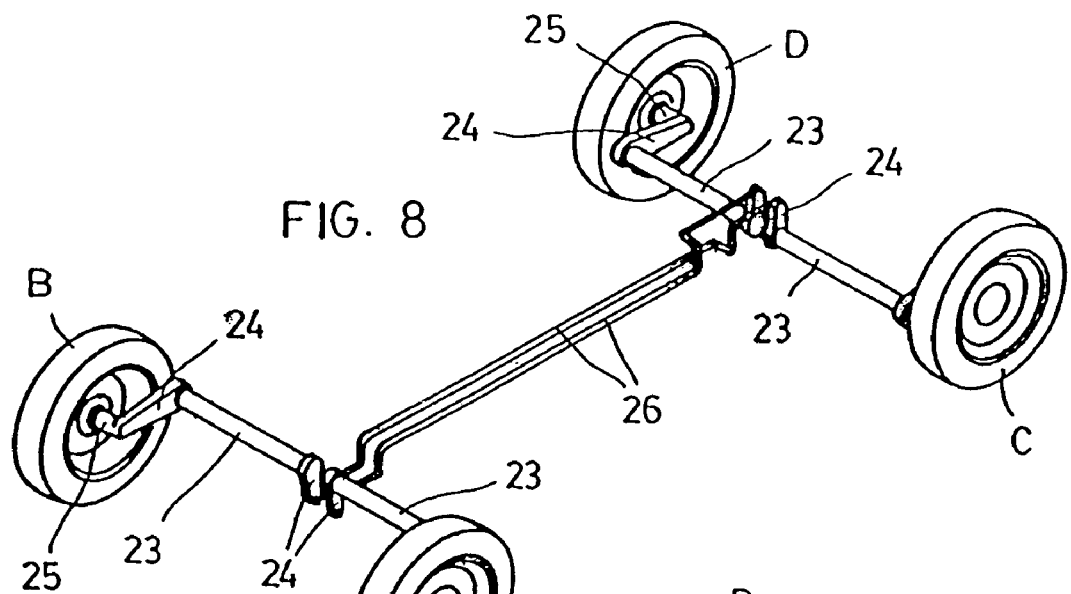
FIG. 8 is a diagrammatic perspective representation of the transverse configuration for the wheels torsion bars related diagonally in pairs through two transmission bars crossing over at some point.

As seen in FIG. 8, direct and inverse transforming elements are made of torsion bars 23 with an arm 24 at each end; one connected to one wheel support 25, and the other to a transmission element 26. Such transmission elements 26 cross over in order to diagonally relate each conjugated pair of wheels.

Figure 9:
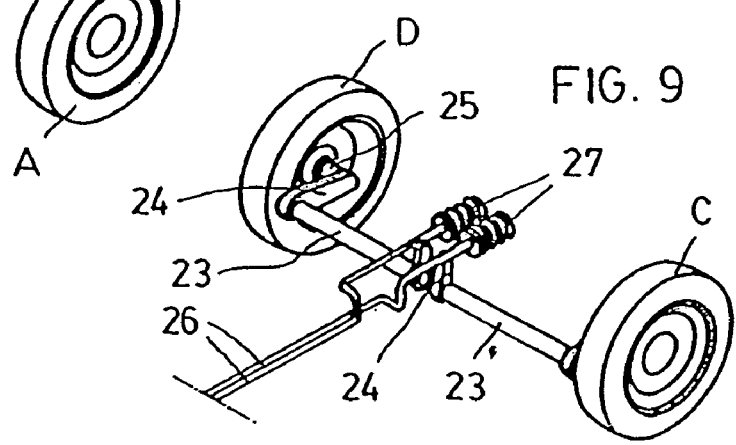
FIG. 9 is a diagrammatic perspective representation of rear side of configuration showed in FIG. 8 where such transmission bars are connected to the vehicle body through independent resilient elements.
Figure 10:
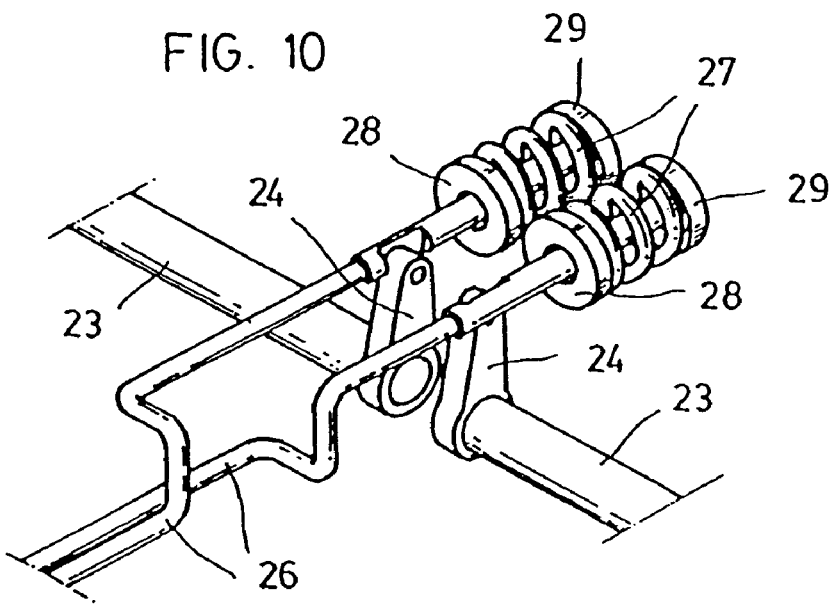
FIG. 10 is a diagrammatic perspective zoomed representation of the resilient elements in FIG. 9.

As seen in FIG. 9 and detail FIG. 10, each transmission element 26A, 26B is connoted to the vehicle body through an elastic element such as a coil spring 27 placed between two brackets, one 28 fixed to the vehicle, and the other 29 fixed to the end of the transmission element.

The placement of coil springs 27 can be implemented as indicated in FIGS. 11 and 12, where the transmission elements 33 are made of two segments 26A and 26B joined at a plate 30 attached to a coil spring 27. Such spring is mounted between two brackets 28 and 29, the former fixed to a crossbeam 31 mounted on the vehicle body, having two rods 32 as a guide for the coil springs 27 and pushing ends 33 applied to the plates 30 that pass loosely through.

FIG. 13 shows a configuration where the two coil springs 27 linked to the transforming elements 26A, 26B are related with the vehicle body through the balance beam 34, linked to the vehicle body through an axis going through the pivot point 35, and to the rods 32 at its ends, having like the previous case pushing ends 33.

Figure 14:
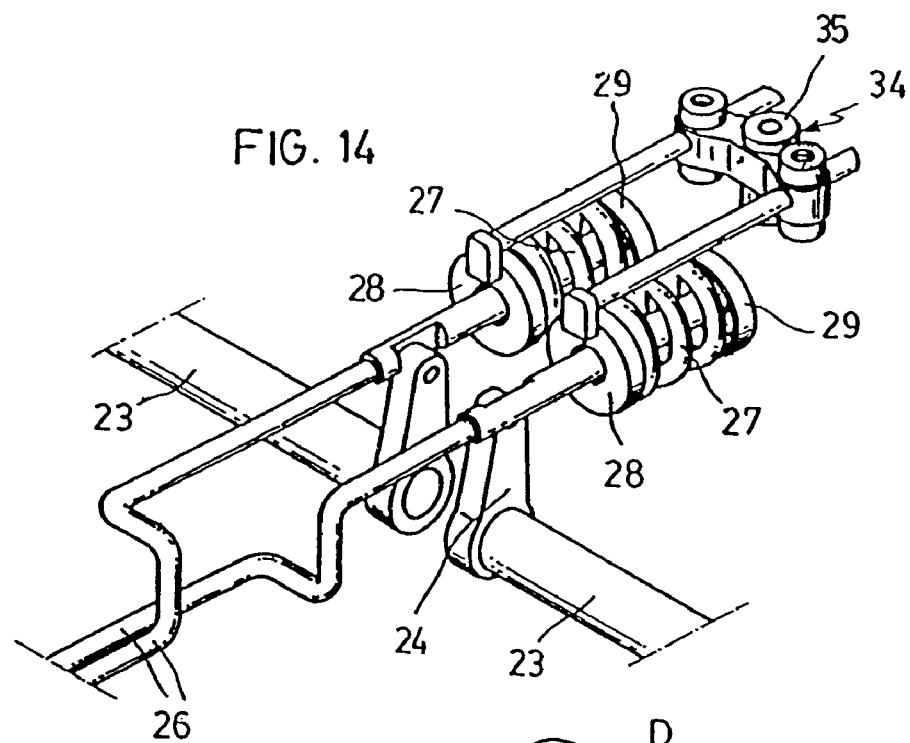
FIG. 14 is a diagrammatic representation of a detail like FIG. 10 where the two resilient elements are not independent and are related through a balance beam.

FIG. 14 shows a different configuration for balance beam 34 that has the brackets 28 and 29 at the ends of its arms with coil springs acting under compression like in FIG. 9.

Figure 15:
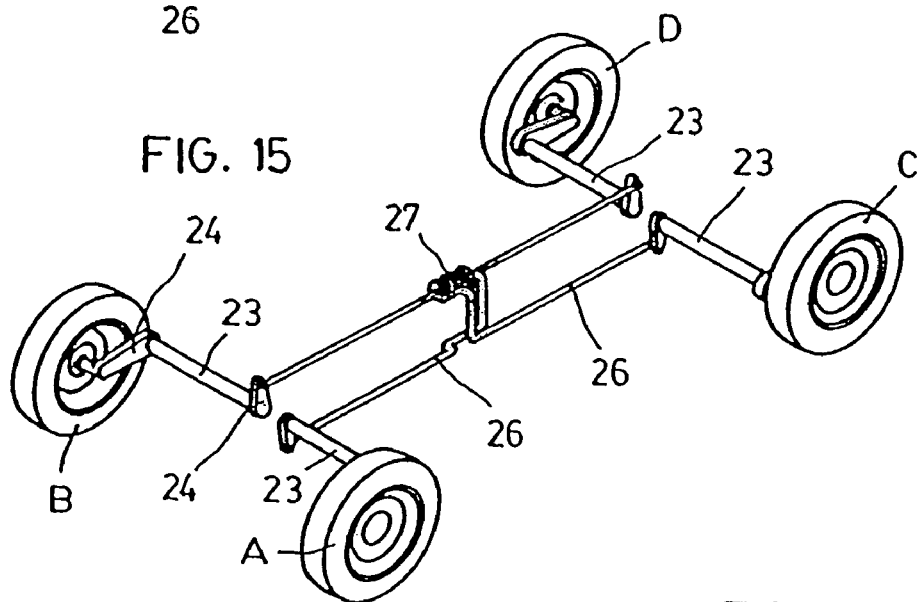
FIG. 15 is a diagrammatic perspective representation of transverse configuration based on torsion bars where the transmission bars are equally crossed and connected through a common resilient element in this case under compression.

FIG. 15, as in previous figures, shows the layout of the transforming elements 23 with a single compressing spring coil 27 that links the two crossing transmission elements 26 arranged in two parallel planes.

Figure 16:
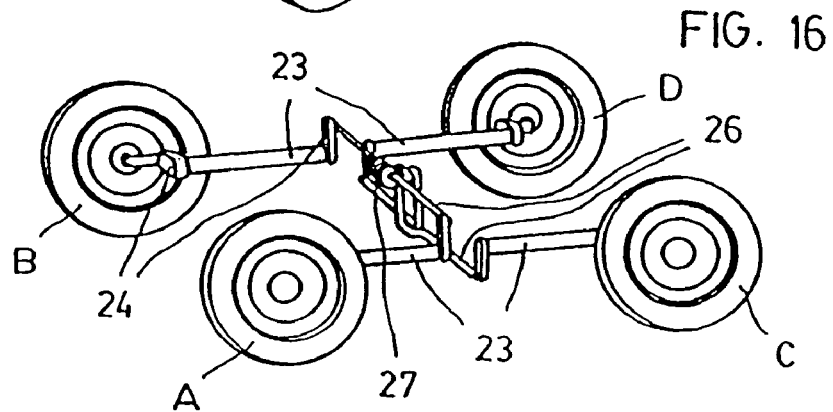
FIG. 16 is a diagrammatic perspective representation of a longitudinal configuration based on torsion bars where the transmission bars are located transversely.

FIG. 16 shows a layout where the direct and inverse transforming axis are arranged longitudinally in respect to the vehicle, and the transmission elements 26 are crossed in the transverse direction, having one single coil spring 27.

Figure 17:
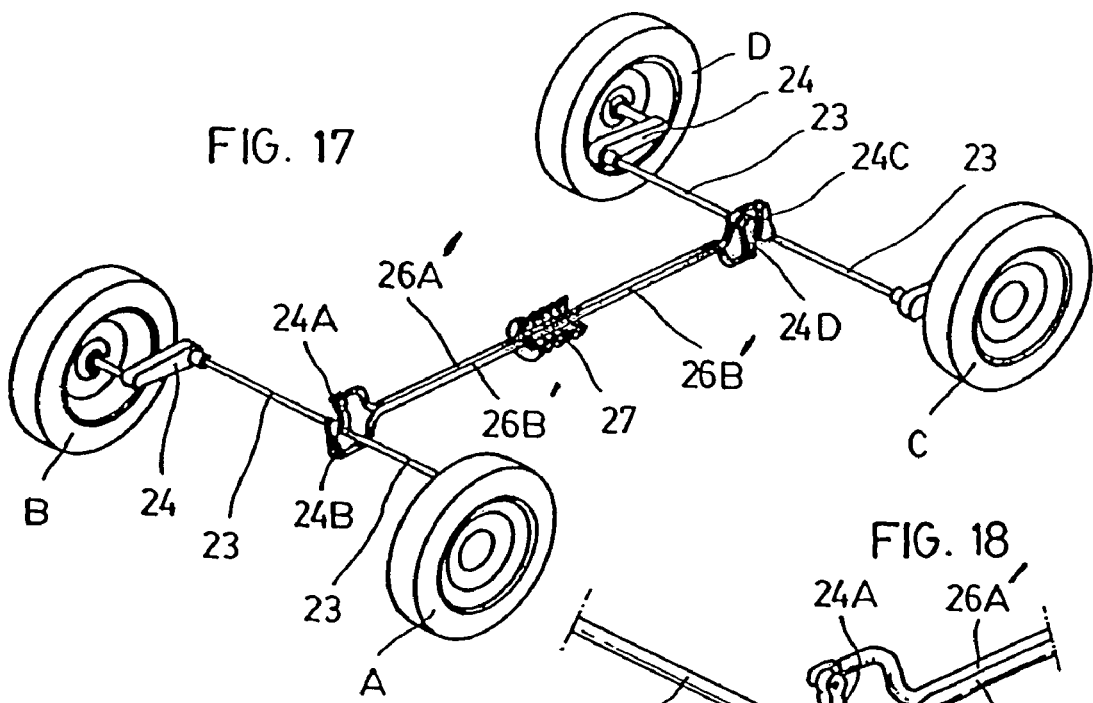
FIG. 17 is a diagrammatic perspective representation of a configuration for a four-wheel vehicle based on torsion bars related through crossed transmission connected to a common resilient element.

FIG. 17 is a representation of a mechanical layout similar to FIG. 15 where the transmission elements 26A' and 26B' are arranged on the same plane, side by side through the single coil spring 27 mounted between the brackets 37, each of them joined to fixtures 38 and 39 each linked to one transmission element 26A' and 26B' as shown in the detail view 19.

Figure 18:
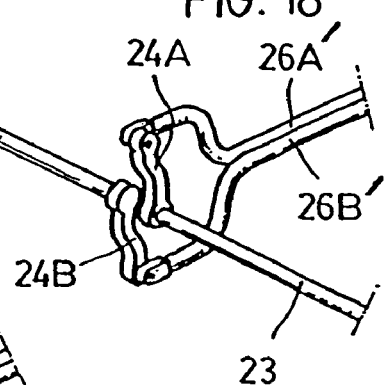
FIGS. 18, 19 and 20 are is a diagrammatic perspective and zoomed representations of details of FIG. 17.
Figure 19:
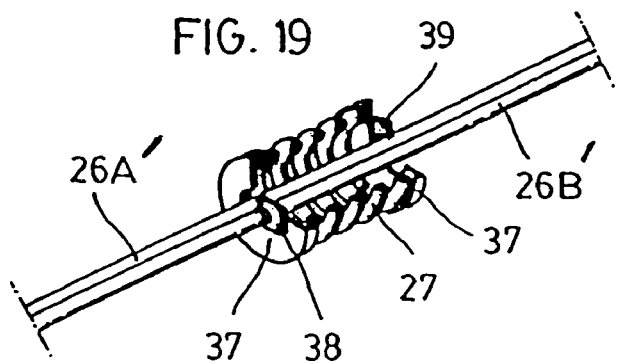
Figure 20:
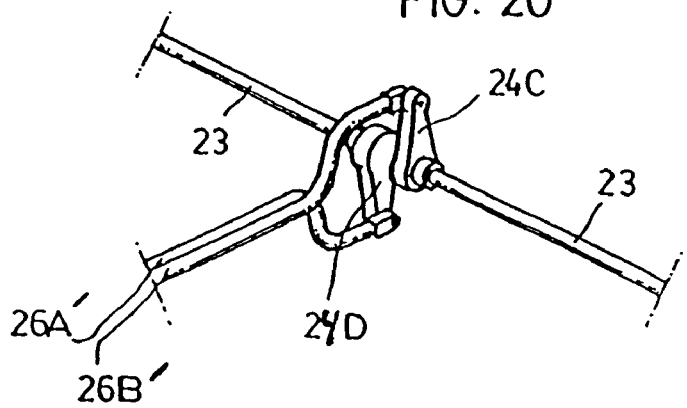

As it can be seen in FIGS. 18 and 20, the transmission elements 26A' and 26B' are crossed over by means of the connecting arms 24A–24D, so the arm 24B is related to arm 24C, and arm 24A to arm 24D.

In this invention, the elastic elements connected to the vehicle body can be mounted on one or two mechanic, electro mechanic or hydraulic actuating elements such that their movement in respect to the vehicle body varies its height in respect to the ground; the balance beam axis can be mounted on one or two mechanic, electro mechanic or hydraulic actuating elements such that their movement in respect to the vehicle body varies its height in respect to the ground; and the central resilient element can have a mechanic, electro mechanic or hydraulic actuating element able to move one of the resilient element fixtures, in such a way that varies its effective length, and by so varies the height of the vehicle in respect to the ground.

Figure 21:
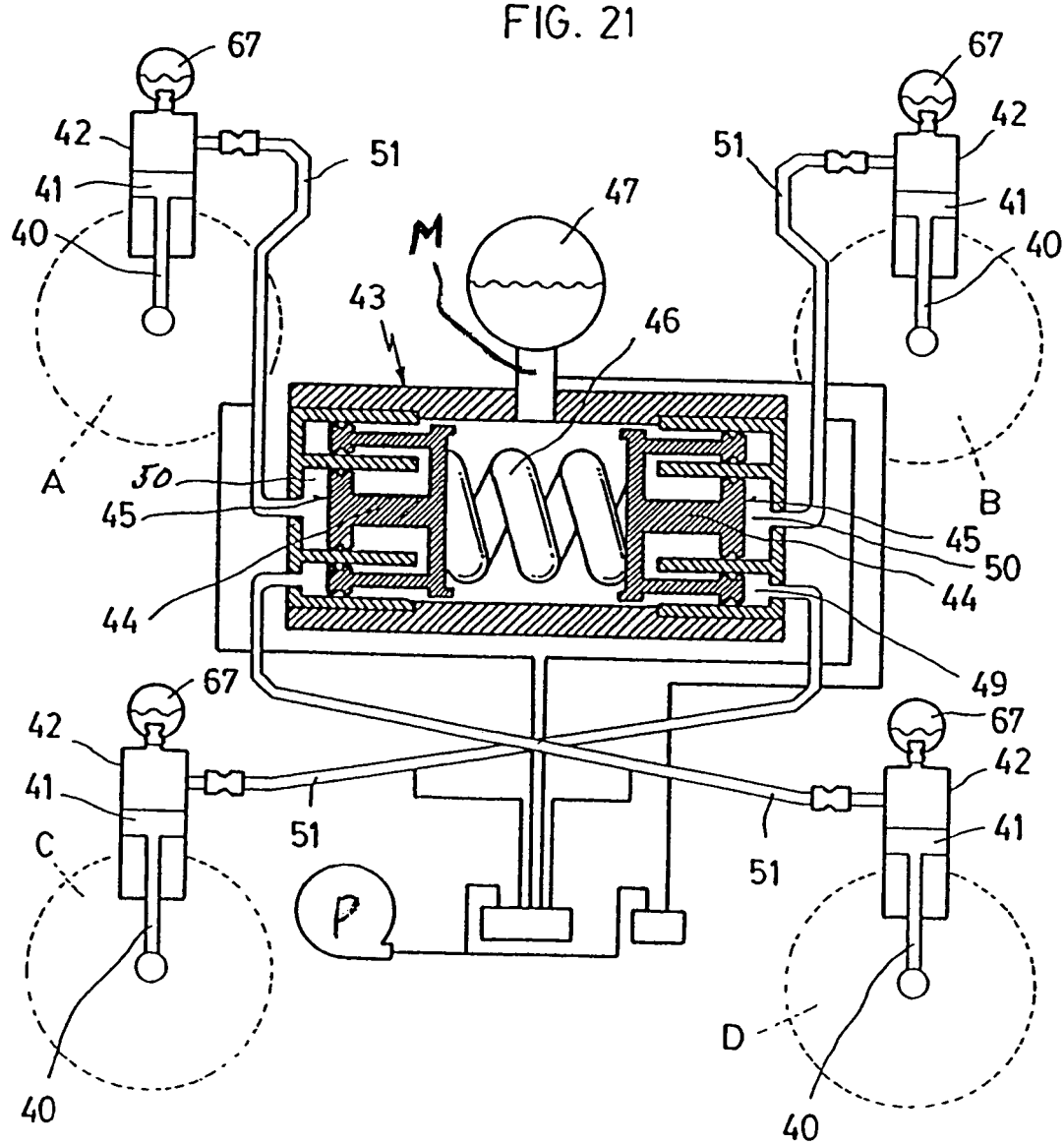
FIG. 21 is a diagrammatic representation of a hydraulic device with simple effect rams applied to the four vehicle wheels.

FIG. 21 shows a variation where each receiving and actuating element of the two pairs of vehicle wheels is made up by the rods 40 of pistons 41 of single effect hydraulic rams 42, the direct and inverse transforming elements are arranged in a unique central hydraulic cylinder 43 containing two free moving and opposed pistons 44. Active areas 45 are equal and concentric, and are subject to an internal actuator made of a coil spring 46 and/or pressurized fluid 47 On the outer side of each piston, a cylindrical compartment 49 and a coaxial compartment 50 corresponds to the active sections of each piston. Each compartment 50 and 49 communicates with a connection 51 that extends towards the corresponding receiving and actuating element 40 for each of the diagonally opposed wheels.

In the above implementation, the active central section of free-moving pistons 44 can be eliminated, acting as active area the inner face where the coil spring is applied.

The actuating devices can be made up with a pair of single effect hydraulic rams as in FIG. 6, with a common acting force. Such two cylinders can be concentric and of equal active area, be made up from three cylinders where one is equivalent to the other two, or four equal rams arranged at the ends of a cross.

Figure 22:
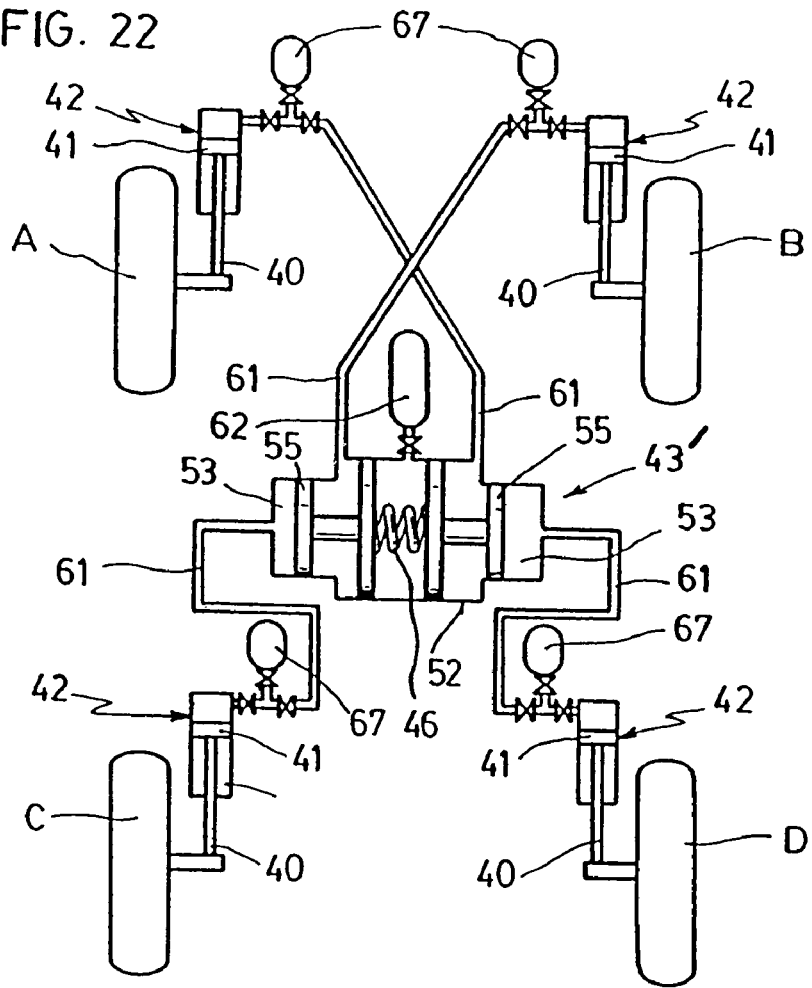
FIG. 22 is a diagrammatic representation of a hydraulic device with simple effect rams applied to the four vehicle wheels.
Figure 23:
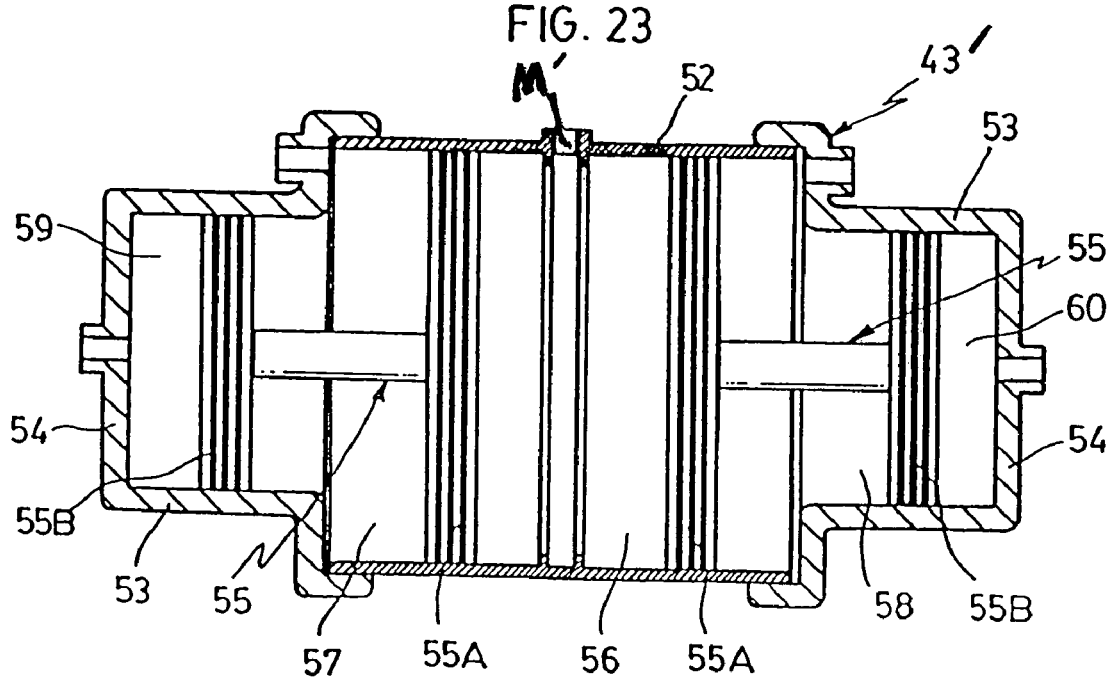
FIG. 23 represents a section of the implementation of the central hydraulic device found in previous FIG.
Figure 24:
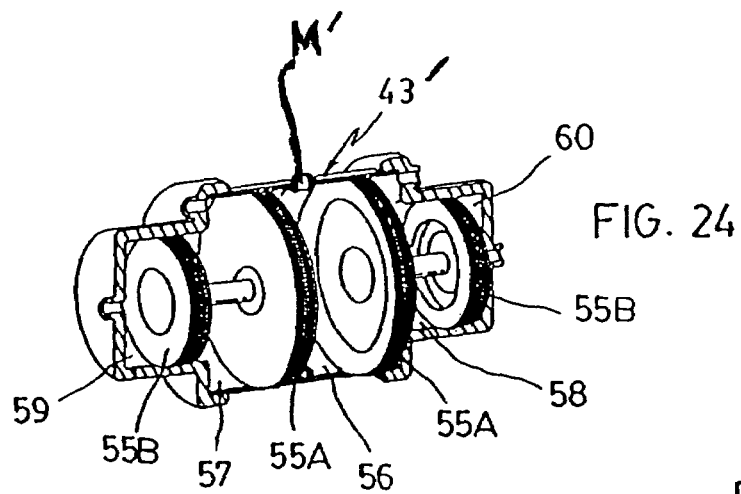
FIG. 24 represents a perspective section of the implementation of the central hydraulic device found in FIG.

FIGS. 22 and 23 represent a variation where the central hydraulic cylinder 43' is made up joining three hollow concentric cylinders, with a central cylinder 52 has a larger diameter, and the side cylinders 53 are the two equal and of smaller diameter, closed at their free ends 54. Inside such hollow body there are two free moving double pistons 55 made up one larger diameter piston 55A placed inside the larger central cylinder 52, and a smaller piston 55B placed inside the corresponding end cylinder 53, thus determining one larger central cavity 56 associated to the central cylinder, 52, two smaller intermediate cavities 57 and 58, and two smaller ending cavities 59 and 60 associated to the side cylinders 53, all cavities connected in such a way that the smaller intermediate cavities 57 and 58 are respectively communicated with the simple effect hydraulic ram 42 for wheels B and A, while the smaller end cavities 59 and 60 are respectively communicated with the simple effect hydraulic ram 42 for wheels C and D. The central cavity 56 has an actuating device made of resilient means such as pressurized fluid 62, coil spring 46 or rubber-like body, the two last cases not represented in FIG. 22. One preferable implementation of such central hydraulic device 43' is shown in FIGS. 23 and 24.

Preferably, the area of the central cylinder 52 is approximately double the area of each side cylinders 53.

The resilient means used in the actuator in the central cavity can be made of a double resilient element that independently pushes pistons 55A that close such larger central cavity 56. Another possibility is to divide the central hydraulic device 43' in two halves that communicate through an additional conduit that has means to regulate the flow of the fluid.

Figure 25:
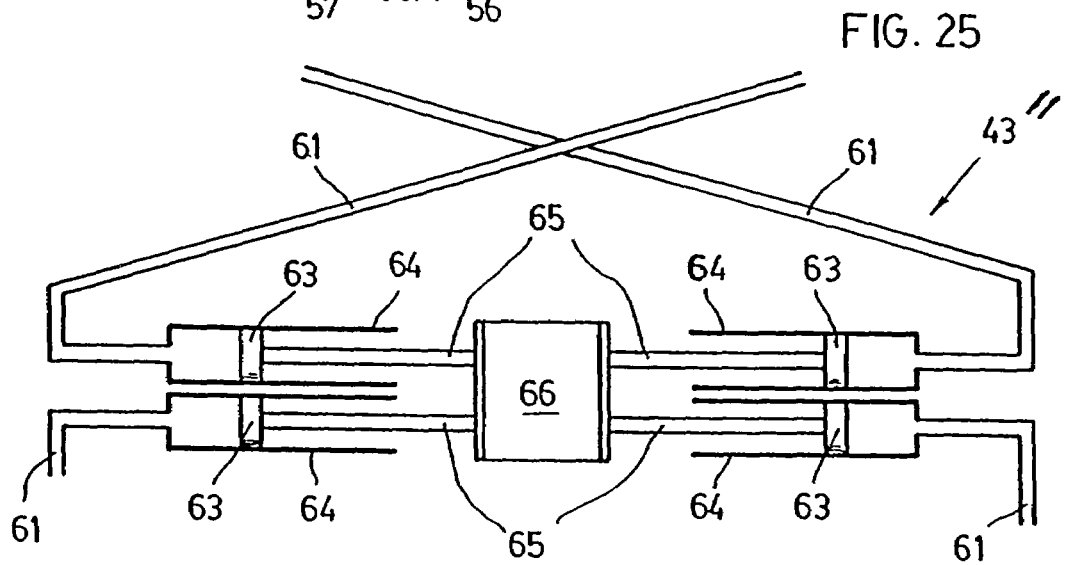
FIG. 25 is a diagrammatic representation of an alternative implementation of the central hydraulic that has is functionally equivalent to the device represented in FIGS. 22 and 23.

FIG. 25 shows an arrangement of the central hydraulic cylinder 43", where each double piston is made of two or more related pistons 63 in single effect hydraulic independent rams 64. The two or more cavities of these new cylinders can substitute the two intermediate smaller cavities 57 and 58 and end cavities 59 and 60 that are separated by the smaller diameter pistons 55B shown in FIG. 24. The hydraulic conduits 61 are connected in a diagonal arrangement, and are communicated by the rods 65 of the two groups of pistons 63 through a single resilient element 66 acting as the actuating device used in the larger central cavity 66.

Figure 26:
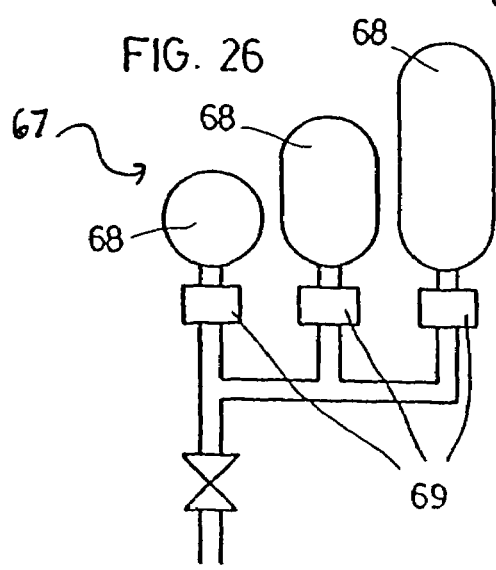
FIG. 26 is a diagrammatic representation of multiple expansion chambers that allows the adjustment of suspension stiffness.

FIG. 22 shows how two-way regulation or damping devices 67 are inserted in the pipes and connect the central hydraulic device with all simple effect hydraulic cylinders 42 associated with the wheels. Additionally, the larger central cavity 56, the smaller intermediate cavities 57 and 58, the end cavities 59 and 60, the hydraulic conduits 61 that connect the cavities with the hydraulic rams 42 associated to each wheel and the very hydraulic rams 42 are connected to the damping devices 67, which can be one or several pneumatic expansion chambers 68 that can be disconnected through electric valves 69, such as these represented in FIG. 26.

Figure 27:
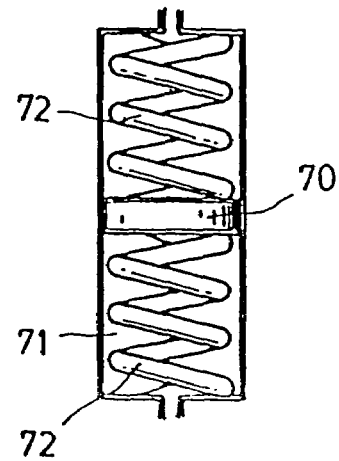
FIG. 27 is a diagrammatic representation of limited volume transfer to be inserted between two hydraulic circuits.

On the other side, the four main hydraulic conduits 61 that connect the smaller cavities 57, 58, 59 and 60 of the central hydraulic device 43' with the simple effect hydraulic rams 42 associated to the wheels are susceptible to be connected among them through devices that allow the flowing of a limited quantity of fluid depending on the pressure differential between the hydraulic conduits. This communication is preferably applied between hydraulic conduits from wheels of the same side of the vehicle. FIG. 27 shows this device made up with a free-moving piston 70 between two coil springs 72 inside cylinder 71.

It has also been anticipated having means to provide pressurized hydraulic or gaseous fluid or drain it from the larger central cavity 56 with the purpose of varying the average distance between the vehicle body and the wheels. For example, FIG. 21 shows an entry M of fluid pressurized by a pump P, and FIGS. 23 and 24 show an entry M'. The same result is obtained including a mechanical device that pushes the two larger diameter pistons 55A placed in the central cavity 56 in the central hydraulic device 43.

Therefore cavity 56 can include one or various resilient elements that have one or various mechanical, hydraulically or electromechanical actuators that can vary the average distance between the vehicle body and the ground.

Additionally it has been anticipated that each hydraulic conduit 61 is derived into one or more devices with a variable volume cavity such as that the circuit pressure increases, it compresses a resilient or pneumatic element that facilitates the entry of hydraulic liquid in the cavity. Analogously, each hydraulic conduit can have one or more regulating devices or valves, passive or active for the hydraulic fluid.

This invention anticipates that one or more wheels are substituted by sets of wheels, each wheel has one single effect hydraulic ram, and all rams communicated among them and with the hydraulic conduit of the wheel set corresponding to the central hydraulic device. Such substitution can be applied to a caterpillar device.

The invention also contemplates the fact that a wheel set of can be used in place of individual wheels. When more than one wheel is used, each wheel has a corresponding single-effect hydraulic ram, and all the hydraulic rams for the wheel set are connected to each other and to the hydraulic central device through the conduit corresponding to the wheel set.

What is claimed is:

1. An anti-roll and anti-pitch device for a vehicle having four wheels provided in a two-by-two arrangement, comprising:
   at least one central resilient element;
   two central actuating elements, wherein the central resilient element is capable of opposing a force provided by a first of the central actuating elements and a force provided by a second of the central actuating elements;
   four wheel actuating elements, each of the wheel actuating elements associated with one of the four wheels and capable of providing a transmitting force caused by a vertical force to which the associated wheel is subjected; and
   four wheel transforming elements;
   wherein:
   each of the wheel transforming elements is capable of transmitting the transmitting force from an associated one of the wheel actuating elements to one of the two central actuating elements;
   the one of the central actuating elements that receives the transmitting force is capable of transmitting the transmitting force to an other of the wheel transforming elements;
   the other of the wheel transforming elements is capable of transmitting the transmitting force to an other of the wheel actuating elements associated with a wheel diagonally opposed to the wheel that is subjected to the vertical force; and
   the other wheel actuating element is capable of providing a corresponding vertical force, which is in a same direction as the vertical force to which the associated wheel is subjected, to the diagonally opposed wheel based on the transmitting force.

2. The device according to claim 1, wherein the at least one central resilient element includes two resilient elements connected to a vehicle body through a balance beam having a central axis and two arms,
   wherein the two arms of the balance beam are connected to the two resilient elements, respectively, and the central axis is connected to the vehicle body.

3. The device of claim 1, wherein:
   the wheel actuating elements include single effect fluid rams;
   each of the wheel transforming elements includes a fluid conduit;
   each of the conduits is connected to one of the two central actuating elements; and
   the central resilient element is a fluid cavity or a resilient component.

4. The device of claim 3, wherein:
   each of the central actuating elements includes a pair of central devices, and
   wherein the pair of central devices of the first central actuating element are connected together, and the pair of central devices of the second central actuating element are connected together.

5. The device of claim 4, further comprising a central cylinder of a first diameter and two concentric side cylinders of a second diameter, and two double pistons, each double piston including a larger diameter piston provided in the central cylinder and a smaller diameter piston provided in one of the side cylinders; wherein:
   the pistons define a plurality of cavities within the central cylinder and two concentric side cylinders, the cavities including a central cavity and two side cavities;
   wherein the conduits are hydraulic conduits and are connected to the cavities; and the central resilient element opposes the movement of each of the larger diameter pistons within the central cavity.

6. The device of claim 5, wherein each of the central cavity, the two side cavities, and the conduits are connected to one or more pneumatic expansion chambers through electric valves.

7. The device of claim 5, wherein one of said conduits is connected to another of said conduits through devices that limit a volume flow between the conduit depending on a pressure differential between the conduits, wherein said one of said conduits is connected to one of the two central actuating elements and the other of said conduits is connected to the other of the two central actuating elements.

8. The device of claim 5, wherein the central resilient element is a mechanical device that provides a thrust between the two larger diameter pistons within the central cavity.

9. The device of claim 5, wherein one of said conduits is shunt connected to another of said conduits such that a pressure increment compresses a resilient element that allows fluid to flow from said one of the conduits to the other conduit, wherein said one of said conduits is connected to one of the two central actuating elements and the other of said conduits is connected to the other of the two central actuating elements.

10. The device of claim 5, further comprising passive or active regulating valves inserted in each of the conduits.

11. The device of claim 4, wherein each of the pairs of central devices includes two pistons linked to each other.

12. The device of claim 3, further comprising a central cylinder of a first diameter and two concentric side cylinders of a second diameter, and two double pistons, each double piston including a larger diameter piston provided in the central cylinder and a smaller diameter piston provided in one of the side cylinders; wherein:

the pistons define a plurality of cavities within the central cylinder and two concentric side cylinders, the cavities including a central cavity and two side cavities;

wherein the conduits are hydraulic conduits and are connected to the cavities; and the central resilient element opposes the movement of the larger diameter pistons within the central cavity.

13. The device of claim 12, further comprising means for introducing pressurized gaseous or hydraulic fluid to the central cylinder, and for draining the central cylinder.

14. The device of claim 3, further comprising a plurality of flow regulation and two-way damping means, wherein each of the flow regulation and two-way damping means are inserted in one of the conduits.

* * * * *